United States Patent
Yamaji

(10) Patent No.: US 10,191,660 B2
(45) Date of Patent: Jan. 29, 2019

(54) STORAGE CONTROL METHOD, STORAGE CONTROL DEVICE, AND STORAGE MEDIUM

(71) Applicant: FUJITSU LIMITED, Kawasaki-shi, Kanagawa (JP)

(72) Inventor: Kazufumi Yamaji, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 310 days.

(21) Appl. No.: 15/202,003

(22) Filed: Jul. 5, 2016

(65) Prior Publication Data
US 2017/0052721 A1    Feb. 23, 2017

(30) Foreign Application Priority Data
Aug. 19, 2015 (JP) .................. 2015-162115

(51) Int. Cl.
G06F 3/06 (2006.01)

(52) U.S. Cl.
CPC ............ *G06F 3/061* (2013.01); *G06F 3/0659* (2013.01); *G06F 3/0689* (2013.01)

(58) Field of Classification Search
CPC ....... G06F 3/061; G06F 3/0659; G06F 3/0689
See application file for complete search history.

(56) References Cited

U.S. PATENT DOCUMENTS

| | | | |
|---|---|---|---|
| 5,740,465 A | 4/1998 | Matsunami et al. | |
| 5,787,473 A | 7/1998 | Vishlitzky et al. | |
| 7,664,917 B2 * | 2/2010 | Oe | G06F 12/0866 711/118 |
| 9,021,160 B2 * | 4/2015 | Tanaka | G11B 20/1217 710/16 |
| 9,529,707 B2 * | 12/2016 | Nakamura | G06F 3/0611 |

(Continued)

FOREIGN PATENT DOCUMENTS

| | | |
|---|---|---|
| JP | 6-75709 | 3/1994 |
| JP | 2010-33396 | 2/2010 |
| JP | 2013-157068 | 8/2013 |

OTHER PUBLICATIONS

U.S. Office Action dated Mar. 15, 2017 from U.S. Appl. No. 14/961,390.

(Continued)

*Primary Examiner* — Ramon A. Mercado
(74) *Attorney, Agent, or Firm* — Staas & Halsey LLP

(57) ABSTRACT

A storage control method executed by a processor included in a storage control device, the storage control device being coupled to a storage including a media cache, the storage being capable of executing a read-modify-write process, the storage control method includes receiving, from the storage, usage information indicating a usage status of the media cache; receiving a write request to write an unaligned data in the storage; transmitting an unaligned data corresponding to the write request to the storage, when the usage information indicates that an available capacity of the media cache is equal to or smaller than a threshold; generating an aligned data from the unaligned data corresponding to the write request by executing the read-modify-write process within the storage control device, when the usage information indicates that the available capacity of the media cache is larger than the threshold; and transmitting the generated aligned data to the storage.

8 Claims, 11 Drawing Sheets

(56) References Cited

U.S. PATENT DOCUMENTS

| | | |
|---|---|---|
| 9,910,599 B2* | 3/2018 | Harada ................... G06F 3/061 |
| 9,922,039 B1* | 3/2018 | Arnnangau ........... G06F 3/0611 |
| 2002/0108017 A1* | 8/2002 | Kenchannnnana-Hoskote ............ G06F 12/0804 711/113 |
| 2009/0024808 A1* | 1/2009 | Hillier, III .......... G06F 13/1642 711/155 |
| 2012/0221809 A1 | 8/2012 | Yoshikawa |
| 2013/0007381 A1* | 1/2013 | Palmer ................ G06F 12/0246 711/154 |
| 2013/0198586 A1* | 8/2013 | Koike ................ G11B 20/1803 714/763 |
| 2017/0052721 A1* | 2/2017 | Yamaji .................... G06F 3/061 |

OTHER PUBLICATIONS

U.S. Office Action dated Aug. 8, 2017 from U.S. Appl. No. 14/961,390.
U.S. Notice of Allowance dated Nov. 17, 2017 from U.S. Appl. No. 14/961,390.

* cited by examiner

FIG. 11

| HDD No | #0 | #1 | ... | #N |
|---|---|---|---|---|
| USAGE STATUS OF MEDIA CACHE | FREE | FREE | ... | FREE |

611a

⇩

| HDD No | #0 | #1 | ... | #N |
|---|---|---|---|---|
| USAGE STATUS OF MEDIA CACHE | FREE | BUSY | ... | FREE |

611b

12
STORAGE CONTROL METHOD, STORAGE CONTROL DEVICE, AND STORAGE MEDIUM

CROSS-REFERENCE TO RELATED APPLICATION

This application is based upon and claims the benefit of priority of the prior Japanese Patent Application No. 2015-162115, filed on Aug. 19, 2015, the entire contents of which are incorporated herein by reference.

FIELD

The embodiment discussed herein is related to a storage control method, a storage control device, and a storage medium.

BACKGROUND

Traditionally, a technique has been disclosed, which is to execute a read-modify-write process in order to write, in storage in which only address ranges that are divisible by a predetermined value are accessible, unaligned data with an address range indivisible by the predetermined value. Storage that has a storage region to be used for the read-modify-write process has been disclosed.

As a related technique, another technique has been disclosed, which is to synthesize data stored in subsectors within a buffer memory before the read-modify-write process and convert the synthesized data into data in a format for long sectors in a data storage device. Another technique has been disclosed, which is to measure a processing speed in a case where the read-modify-write process is executed mainly by a host controller and a processing speed in a case where the read-modify-write process is executed mainly by a medium controller and execute the read-modify-write process mainly by a controller of which the measured processing speed is higher. As related art, Japanese Laid-open Patent Publication No. 2013-157068, Japanese Laid-open Patent Publication No. 2010-33396, and the like have been disclosed.

According to the related techniques, however, when a higher-level device with respect to storage such as a hard disk drive (HDD) causes the storage to execute the read-modify-write process, the performance of responding to a request to write unaligned data may be reduced. For example, if a storage region to be used for the read-modify-write process does not include an available region, and the read-modify-write process is executed by storage, the performance of responding to a request to write unaligned data is reduced. It is, therefore, desirable to suppress a reduction in the performance of responding to a request to write unaligned data.

SUMMARY

According to an aspect of the invention, a storage control method executed by a processor included in a storage control device, the storage control device being coupled to a storage including a media cache, the storage being capable of executing a read-modify-write process that includes generating, by using the media cache, aligned data with an address range divisible by a predetermined value from unaligned data with an address range indivisible by the predetermined value, the storage control method includes receiving, from the storage, usage information indicating a usage status of the media cache; receiving a write request to write the unaligned data in the storage; transmitting the unaligned data corresponding to the write request to the storage, when the usage information indicates that an available capacity of the media cache is equal to or smaller than a threshold; generating the aligned data from the unaligned data corresponding to the write request by executing the read-modify-write process within the storage control device, when the usage information indicates that the available capacity of the media cache is larger than the threshold; and transmitting the generated aligned data to the storage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is an explanatory diagram illustrating an example of details stored in a media cache state management table.

DESCRIPTION OF EMBODIMENT

Hereinafter, an embodiment of a storage control device disclosed herein, a storage control method disclosed herein, and a storage control program disclosed herein is described with reference to the accompanying drawings.

Figure 1:
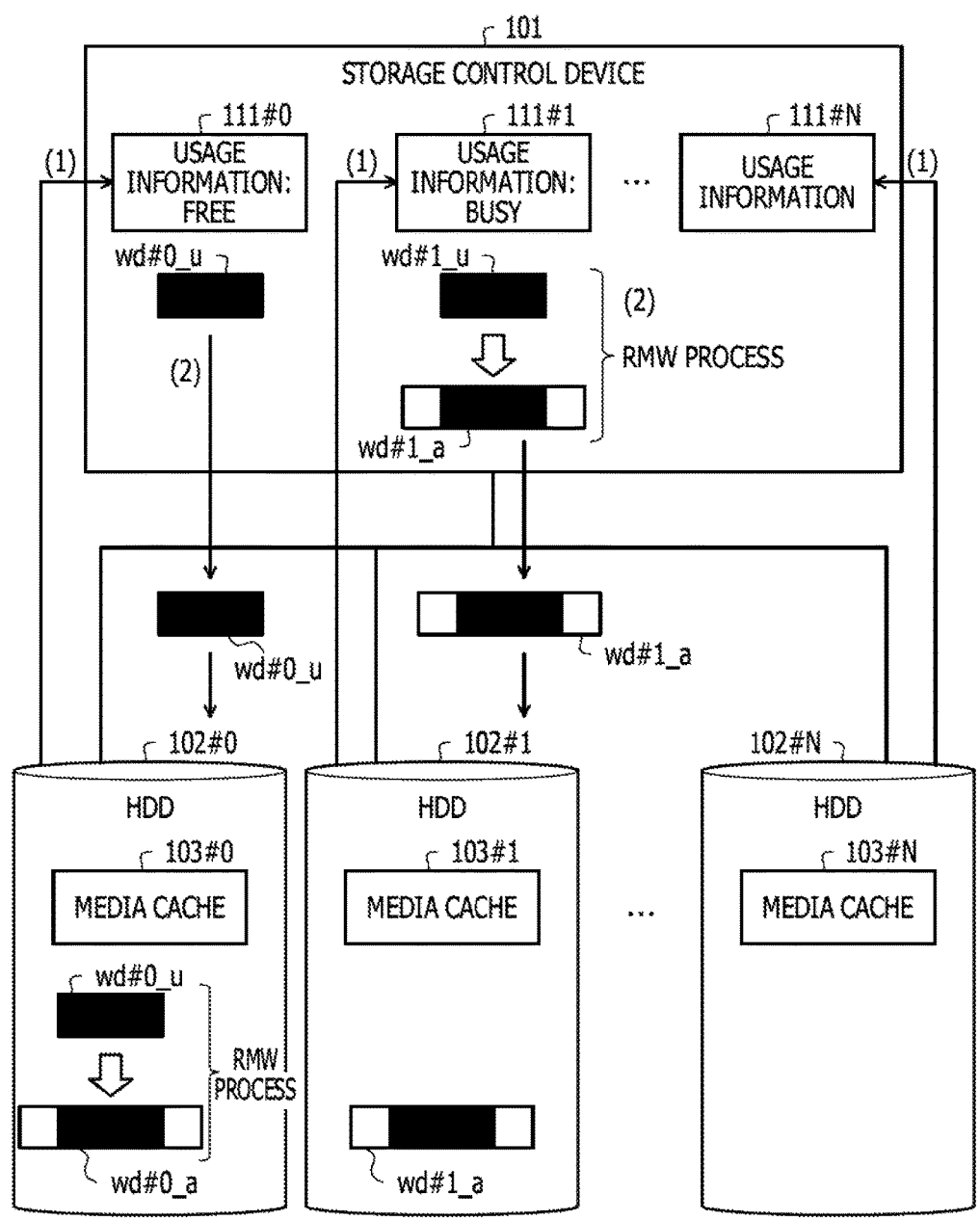
FIG. 1 is an explanatory diagram illustrating operations of a storage control device according to an embodiment.

FIG. 1 is an explanatory diagram illustrating an example of operations of a storage control device 101 according to the embodiment. The storage control device 101 is a computer configured to control storage that is one or more storage devices. The storage is one or more devices configured to store data. The storage is, for example, HDDs, solid state drives (SSDs), or the like. The following example assumes that the storage is HDDs. For example, the storage control device 101 provides storage regions of the storage to a server or the like that is a higher-level device with respect to the storage control device 101.

The storage control device 101 combines multiple HDDs by a Redundant Arrays of Inexpensive Disks (RAID) technique and thereby provides a virtual disk. In the RAID technique, RAID levels that indicate how the virtual disk is formed are used. The embodiment is applicable to any of RAID 0 to RAID 6. The embodiment is applicable to a RAID level, such as RAID 1+5, obtained by combining RAID levels.

In recent years, the capacities of HDDs have increased, and the amounts of data to be processed at one time have increased. With the increases, Advanced Format, a method of reducing gaps on tracks within an HDD by increasing the sizes of physical sectors from 512 bytes to 4 kilo bytes (KB), is provided. An HDD that supports Advanced Format has an emulating function that enables a logical sector of 512 bytes to be accessed from outside the HDD in order to support a host that accesses only sectors of 512 bytes, although sectors included in the HDD are physical sectors of 4 KB.

The HDD that supports Advanced Format uses the emulating function to access data on a 512 byte basis. The following description assumes that if an HDD is merely described, the HDD supports Advanced Format. In writing of data in the physical sectors of 4 KB without boundary access, the data is written in the physical sectors included in the HDD only on a 4 KB basis. The boundary access is access to an address range divisible by a predetermined value. The address range divisible by the predetermined value is referred to as a "predetermined value boundary" in some cases. For example, an address range divisible by 4 KB is referred to as a "4 KB boundary" in some cases. The predetermined value may be any value such as 4 KB, 8 KB, or 16 KB. In the embodiment, the predetermined value is 4 KB.

A requirement for the address range divisible by the predetermined values is that the initial address and last address of the address range are divisible by the predetermined value. For example, access to an address range of which the initial address is divisible by the predetermined value and in which a data length is divisible by the predetermined value is the boundary access.

In the following description, data to be accessed by the boundary access is referred to as aligned data. Specifically, the aligned data is data with an address range of which the initial and last address are divisible by the predetermined value. On the other hand, data to be accessed without the boundary access is referred to as unaligned data. Specifically, the unaligned data is data with an address range of which at least any of the initial and last addresses is not divisible by the predetermined value.

Figure 5:
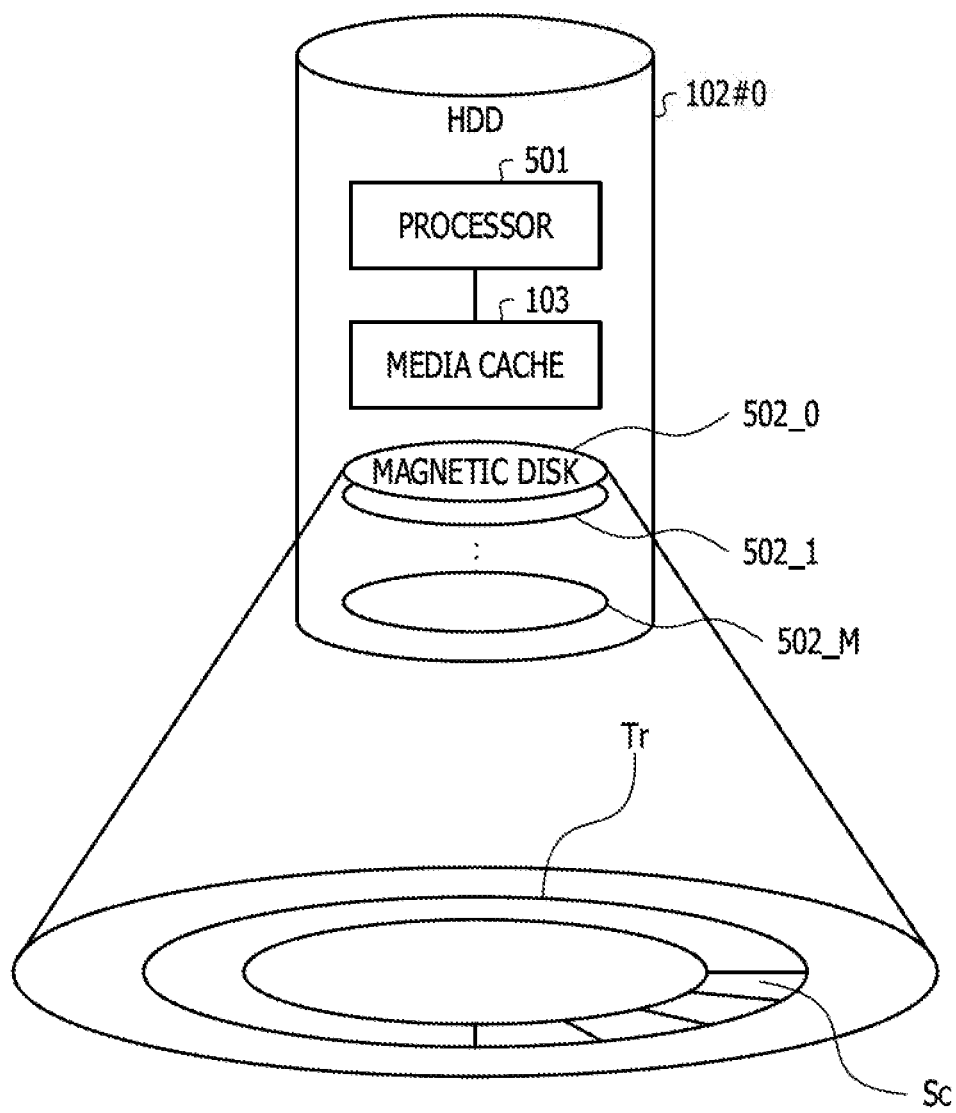
FIG. 5 is an explanatory diagram illustrating an example of an HDD.

When receiving a request to write unaligned data, an HDD executes a read-modify-write (RMW) process, which is described below. First, the HDD writes the unaligned data in a region that is referred to as a media cache. A hardware configuration of the HDD including the media cache is illustrated in FIG. 5. Next, the HDD reads data stored in physical sectors included in a 4 KB boundary into a dynamic random access memory (DRAM) included in the HDD (read). The DRAM included in the HDD is a storage region in which an arbitrary address is accessible. Then, the HDD updates data stored on the media cache and to be written in logical sectors in accordance with a write request from the higher-level device such as a server (modify). In the updating, the HDD updates the data by writing the unaligned data over the data written in physical sectors included in a 4 KB boundary in the DRAM within the HDD.

Next, the HDD rewrites, in the physical sectors, the updated data written on the media cache (write). In accordance with a request to write aligned data, the HDD does not execute the RMW process on the data and writes the data directly on a magnetic disk included in the HDD.

The RMW process may be executed by the higher-level device with respect to the HDDs. In general, in the case where the RMW process is not executed by the higher-level device with respect to the HDDs and is executed by the HDDs, the RMW is executed without an interface between the HDDs and the higher-level device with respect to the HDDs, and high writing performance is achieved.

However, if the higher-level device with respect to the HDDs causes the HDDs to execute the RMW process, the performance of responding to a request to write unaligned data may be reduced. For example, if a media cache does not have an available region and the higher-level device causes an HDD including the media cache to execute the RMW process, the higher-level device stands by until the media cache has an available region. Thus, the performance of the responding to a request to write unaligned data is reduced. The case where the media cache does not have an available region is when a request to write unaligned data is continuously transmitted to the HDD, the RMW process is completed, and a process of releasing data stored on the media cache and to be written is not executed in time.

It is considered that the higher-level device with respect to the HDDs tests the performance of the HDDs, whether or not the media caches are insufficient is estimated based on data of the testing of the performance of the HDDs, and the RMW process to be executed by the HDDs and the RMW process to be executed by the higher-level device with respect to the HDDs are dynamically switched. In this case, however, if it is assumed that an operation is executed in a case where a failed HDD is to be replaced, the performance testing is conducted for each of times when a failed HDD is replaced. A time period in which data is not stored in a replaced HDD exists during the performance testing. If data is written during the performance testing, the writing that is to be executed during the performance testing and normal writing are executed and loads to be applied to write elements increase for the writing executed during the performance testing. Thus, the life of the HDDs is reduced.

The embodiment describes a method of switching a main device for executing the RMW process between the storage control device 101 and the HDDs based on usage statuses, provided by the HDDs, of the media caches.

Operations of the storage control device 101 are described with reference to FIG. 1. The storage control device 101 controls HDDs 102#0 to 102#N. The storage control device 101 provides a virtual disk obtained by combining the HDDs 102#0 to 102#N by the RAID technique to a device that uses the storage control device 101. The storage control device 101 may form the single virtual disk by combining the HDDs 102#0 to 102#N or form multiple virtual disks by combining the HDDs 102#0 to 102#N. For example, if the storage control device 101 forms the single virtual disk by combining the HDDs 102#0 to 102#N, the HDDs 102#0 to 102#N belong to a single RAID group. The HDDs 102#0 to 102#N support Advanced Format and have media caches 103#0 to 103#N, respectively. The storage control device 101 may control both HDDs supporting Advanced Format and HDDs that do not support Advanced Format.

As indicated by (1) in FIG. 1, the storage control device 101 receives usage information 111 from the HDDs 102#0 to 102#N. The storage control device 101 causes the received usage information 111 to be stored in a storage unit accessible from the storage control device 101. The usage information 111 indicates usage statuses of the media caches 103 of the HDDs 102. For example, the usage information 111 is either identifiers indicating states in which the media caches 103 are used or identifiers indicating states in which the media caches 103 are not used. The states in which the media caches 103 are used are when available capacities of the media caches 103 are equal to or smaller than a predetermined threshold. The states in which the media caches 103 are not used are when available capacities of the media caches 103 are larger than the predetermined threshold.

The identifiers that indicate that the media caches 103 are used indicate "busy", while the identifiers that indicate that the media caches 103 are not used indicate "free".

The times when the storage control device 101 receives the usage information 111 are arbitrary. For example, the storage control device 101 may transmit commands to the HDDs 102 and receive results of executing the commands and the usage information 111 from the HDDs 102 in response to the transmission of the commands. The commands are commands to instruct the HDDs 102 to execute specific functions. For example, the commands to be transmitted to the HDDs 102 include a write command to request data to be written at a certain address, a read command to request data to be read from a certain address, and a test unit ready command.

If the HDDs 102 transmit the results of executing the commands to the storage control device 101, the HDDs 102 may transmit the usage information 111 together with the results of executing the commands only when the usage statuses of the media caches 103 change. Alternatively, the HDDs 102 may transmit the usage information 111 together with the results of executing the commands at any time. The storage control device 101 may transmit a request to transmit the usage information 111 to the HDDs 102, and the HDDs 102 may receive the request to transmit the usage information 111 and may transit the usage information 111 to the storage control device 101. When a usage status of a media cache 103 changes, the storage control device 101 may receive the usage information 111 spontaneously transmitted by an HDD 102 including the media cache 103. In the following example, the storage control device 101 transmits commands to the HDDs 102 and receives results of executing the commands in response to the transmission of the commands. Then, the storage control device 101 receives the usage information 111 only when the usage statuses of the media caches 103 change.

In the example illustrated in FIG. 1, the storage control device 101 receives usage information 111#0 from the HDD 102#0, receives usage information 111#1 from the HDD 102#1, . . . , and receives usage information 111#N from the HDD 102#N. The usage information 111#0 illustrated in FIG. 1 indicates "free". The usage information 111#1 illustrated in FIG. 1 indicates "busy".

It is assumed that unaligned data to be written in an HDD 102 is generated. In this case, as indicated by (2) in FIG. 1, the storage control device 101 executes, based on the usage information 111, any of a process of transmitting a request to write the data to the HDD 102 and a process of executing the RMW process on the data to be written. A case where the data is generated is when the storage control device 101 receives a write request from a higher-level server with respect to the storage control device 101, for example. When data stored in any of the HDDs 102#0 to 102#N is to be migrated to another one of the HDDs 102#0 to 102#N, the data to be written is generated.

The example illustrated in FIG. 1 assumes that a request to write data in the virtual disk is provided from the server that is a higher level device with respect to the storage control device 101. In addition, the example illustrated in FIG. 1 assumes that data wd#0_u to be written in the HDD 102#0 and data wd#1_u to be written in the HDD 102#1 are generated. The data wd#0_u and wd#1_u to be written are unaligned data.

Since the usage information 111#0 indicates "free", the storage control device 101 transmits, to the HDD 102#0, a write command to request the data wd#0_u to be written. The HDD 102#0 receives the write command, executes the RMW process on the data wd#0_u to be written, and thereby obtains aligned data wd#0_a. Then, the HDD 102#0 writes the data wd#0_a in a magnetic disk included in the HDD 102#0.

Since the usage information 111#1 indicates "busy", the storage control device 101 executes the RMW process on the data wd#1_u to be written and thereby obtains aligned data wd#1_a. Then, the storage control device 101 transmits, to the HDD 102#1, a write command to request the data wd#1_a to be written. The HDD 102#1 receives the write command and writes the data wd#1_a in a magnetic disk included in the HDD 102#1.

Regions that are represented in black and included in the data wd#0_a and wd#1_a illustrated in FIG. 1 and to be written indicate the same data as the data wd#0_u and wd#1_u. Regions that are represented in white and included in the data wd#0_a and wd#1_a indicate data read from the magnetic disks.

In this manner, the storage control device 101 may optimize the RMW process of the two types and thereby improve the performance of the writing in the HDDs 102. Since the storage control device 101 does not test the performance of the HDDs 102, a time period in which data is not able to be stored in the HDDs 102 may not exist. Since the storage control device 101 does not test the performance of the HDDs 102, the storage control device 101 may suppress reductions, caused by the performance testing, in the life of the HDDs 102. Next, an example in which the storage control device 101 is applied to a disk array device is described with reference to FIG. 2.

Figure 2:
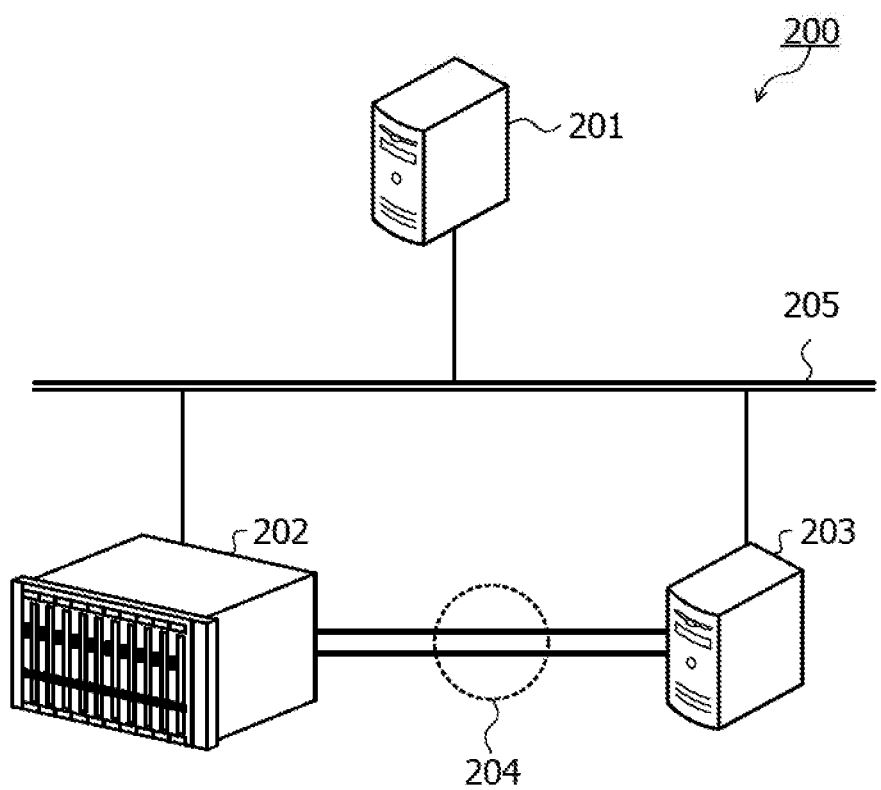
FIG. 2 is an explanatory diagram illustrating an example of an information processing system.

FIG. 2 is an explanatory diagram illustrating an example of an information processing system 200. The information processing system 200 includes a managing device 201, a disk array device 202, and a server 203. The disk array device 202 and the server 203 are coupled to a storage area network (SAN) 204. The disk array device 202, the managing device 201, and the server 203 are coupled to a network 205. The network 205 is, for example, a local area network (LAN).

The disk array device 202 includes multiple HDDs and stores data to be used for a process to be executed by the server 203. When receiving a command to write data from the server 203, the disk array device 202 writes the data in at least any of the HDDs included in the disk array device 202. The disk array device 202 transmits a result of the writing to the server 203. When receiving, from the server 203, a command to read data, the disk array device 202 reads the data from at least any of the HDDs included in the disk array device 202 and transmits the read data to the server 203. The disk array device 202 may include the HDDs and SSDs.

The managing device 201 is a server computer configured to operate and manage the disk array device 202. The managing device 201 configures operation control settings in the disk array device 202 through the network 205, for example. The managing device 201 may transmit a program to be executed by the disk array device 202, for example, a firmware program to the disk array device 202 through the network 205.

The server 203 is a server computer configured to access data stored in the disk array device 202. The server 203 executes a business application program and provides a business process service to users.

Figure 3:
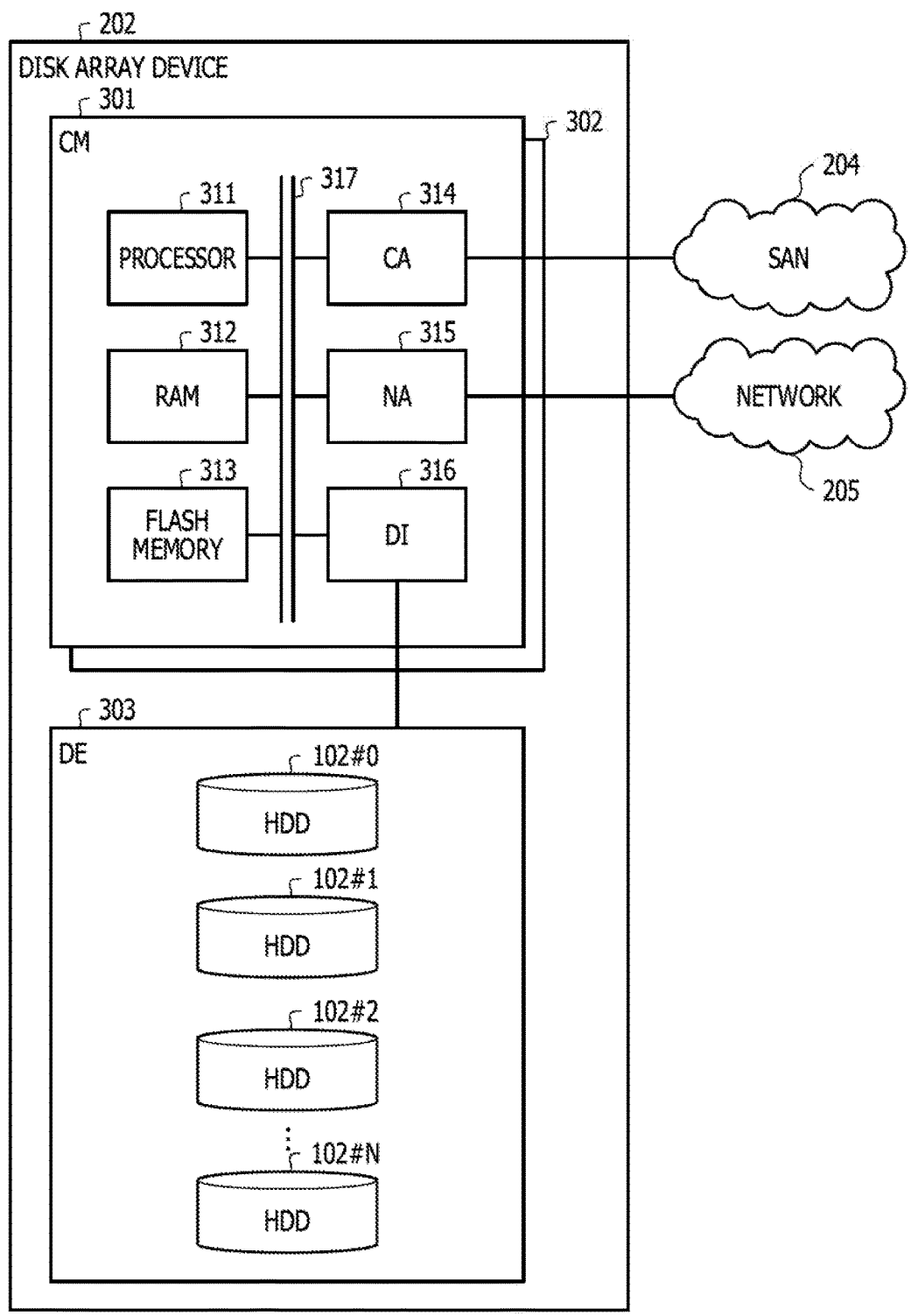
FIG. 3 is an explanatory diagram illustrating an example of a hardware configuration of a disk array device.

FIG. 3 is an explanatory diagram illustrating an example of a hardware configuration of the disk array device 202. The disk array device 202 includes controller modules (CMs) 301 and 302 and a drive enclosure (DE) 303.

The CMs 301 and 302 manage storage regions of the HDDs 102 included in the DE 303 and control access to data stored in the storage regions. The CMs 301 and 302 are made redundant within the disk array device 202 so as to improve the performance of access to data and fault tolerance. The CMs 301 and 302 are an example of the storage control device 101 illustrated in FIG. 1. The following example describes the CM 301.

The CM 301 includes a processor 311, a RAM 312, a flash memory 313, a channel adaptor (CA) 314, a network adaptor (NA) 315, and a drive interface (DI) 316. The hardware components from the processor 311 to the DI 316 are coupled to a bus 317. The CM 302 has the same hardware as the CM 301.

The processor 311 controls information processing to be executed by the CM 301. The processor 311 may be a multi-processor. The processor 311 is a central processing unit (CPU), a digital signal processor (DSP), an application specific integrated circuit (ASIC), a field programmable gate array (FPGA), or the like, for example. The processor 311 may be a combination of two or more elements among the CPU, DSP, ASIC, FPGA, and the like.

The RAM 312 is a main storage device of the CM 301. The RAM 312 temporarily stores at least a part of the firmware program to be executed by the processor 311. The flash memory 313 is an auxiliary storage device of the CM 301. The flash memory 313 is a nonvolatile semiconductor memory. The flash memory 313 stores the firmware program and the like.

The CA 314 is a communication interface configured to communicate with the server 203 through the SAN 204. The type of the communication interface that is the CA 314 is a fiber channel, a small computer system interface (SCSI), or the like, for example. The CM 301 may have multiple CAs made redundant.

The NA 315 is a communication interface configured to communicate with another computer through the network 205. The type of the communication interface that is the NA 315 is a network interface card (NIC) for LAN connection, for example. The CM 301 may have multiple NAs made redundant.

The DI 316 is a communication interface configured to communicate with the DE 303. The type of the communication interface that is the DI 316 is a fiber channel, an SCSI, or the like, for example. The CM 301 may have multiple DIs made redundant.

The DE 303 is an enclosure for storing multiple HDDs including the HDDs 102#0 to 102#N. N is an integer of one or greater. The CMs 301 and 302 use the HDDs 102#0 to 102#N to achieve logical storage regions with high data access performance and high fault tolerance to the HDDs by the RAID technique.

Figure 4:
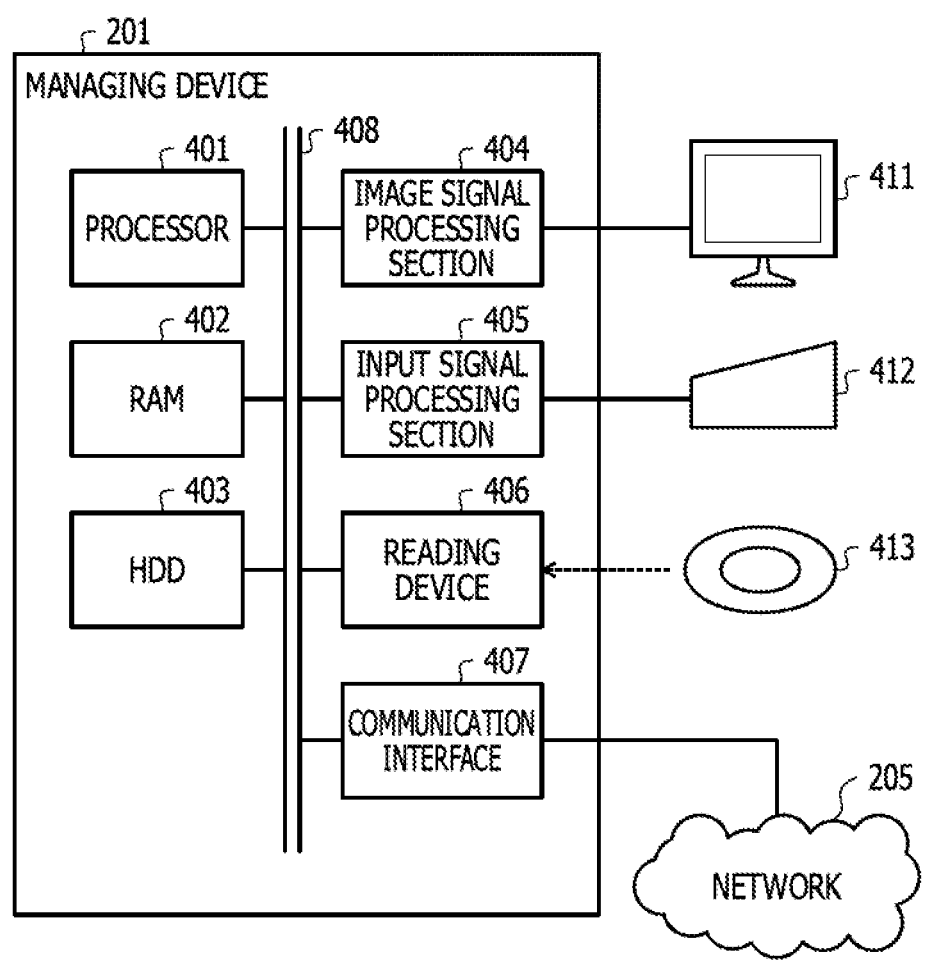
FIG. 4 is an explanatory diagram illustrating an example of a hardware configuration of a managing device.

FIG. 4 is an explanatory diagram illustrating an example of a hardware configuration of the managing device 201. The managing device 201 includes a processor 401, a RAM 402, an HDD 403, an image signal processing section 404, an input signal processing section 405, a reading device 406, and a communication interface 407. The hardware components from the processor 401 to the communication interface 407 are coupled to a bus 408 of the managing device 201.

The processor 401 controls information processing to be executed by the managing device 201. The processor 401 may be a multi-processor. The processor 401 is a CPU, a DSP, an ASIC, an FPGA, or the like, for example. The processor 401 may be a combination of two or more elements among the CPU, the DSP, the ASIC, the FPGA, and the like.

The RAM 402 is a main storage device of the managing device 201. The RAM 402 temporarily stores a program of an operating system (OS) to be executed by the processor 401 or at least a part of an application program. The RAM 402 stores data of various types that is used for a process to be executed by the processor 401.

The HDD 403 is an auxiliary storage device of the managing device 201. The HDD 403 magnetically writes and reads data in and from a magnetic disk included in the HDD 403. The HDD 403 stores the program of the OS, the application program, and the data of the various types. The managing device 201 may include an auxiliary storage device of another type such as a flash memory or an SSD or may include multiple auxiliary storage devices.

The image signal processing section 404 outputs an image to a display 411 coupled to the managing device 201 in accordance with a command from the processor 401. The display 411 is a cathode ray tube (CRT) display, a liquid crystal display, or the like, for example.

The input signal processing section 405 acquires an input signal from an input device 412 coupled to the managing device 201 and outputs the acquired input signal to the processor 401. The input device 412 is a pointing device such as a mouse or a touch panel, a keyboard, or the like, for example.

The reading device 406 is configured to read a program and data stored in a storage medium 413. As the storage medium 413, a magnetic disk such as a flexible disk (FD) or an HDD, an optical disc such as a compact disc (CD) or a digital versatile disc (DVD), or a magneto-optical (MO) disk may be used, for example. As the storage medium 413, a nonvolatile semiconductor memory such as a flash memory card may be used, for example. The reading device 406 causes the program and data read from the storage medium 413 to be stored in the RAM 402 or the HDD 403 in accordance with a command from the processor 401. The processor 401 may transmit, to the disk array device 202, the program and data read from the storage medium 413, for example, the firmware program to be executed by the disk array device 202 and the data.

The communication interface 407 communicates with another device through the network 205. The communication interface 407 may be a wired communication interface or a wireless communication interface.

FIG. 5 is an explanatory diagram illustrating an example of the HDD 102#0. The HDD 102#0 includes a processor 501, the media cache 103, and magnetic disks 502_0 to 502_M. M is an integer of 0 or greater. Each of the HDDs 102#1 to 102#N has the same hardware as the HDD 102#0.

The processor 501 executes the RMW process on the HDD 102#0. The processor 501 may be an ASIC or FPGA for the RMW process or may be a general-purpose processor that executes a program for the RMW process.

The media cache 103 is a storage region to be used for the RMW process by the processor 501. The media cache is used as a cache for temporarily storing data in the RMW process. The media cache 103 may be a part of storage regions of the magnetic disks 502_0 to 502_M included in the HDD 102#0 or may be a semiconductor memory installed separately from the magnetic disks 502. A method of installing the processor 501 for the RMW process and the media cache 103 may vary depending on a vendor of the HDD 102. For example, the media cache 103 may be a part of the storage regions of the magnetic disks 502_0 to 502_M and be divided into and exist across multiple regions. The data size of the media cache 103 varies depending on the vendor of the HDD 102. At least any of the HDDs 102 may not include a media cache 103.

FIG. 5 illustrates an example of the inside of the magnetic disk 502_0. Each of the magnetic disks 502_1 to 502_M has the same structure as the magnetic disk 502_0. Regions formed between edges of concentric circles on the magnetic disk 502_1 are referred to as tracks. A track Tr illustrated in FIG. 5 is one of the multiple tracks on the magnetic disk 502_0. Regions physically partitioned on the track Tr on a predetermined size basis are referred to as physical sectors. A physical sector Sc is one of the multiple physical sectors on the track Tr.

The HDD 102#1 supports Advanced Format. Thus, the sizes of the physical sectors are each 4096 bytes=4 KB. A structure in which physical sectors of 4 KB are arranged on a magnetic disk 502 is referred to as 4 KB alignment in some cases. Each of the sizes of the physical sectors may be another size such as 8 KB or 16 KB. In such a case, data is written on the magnetic disks 502 of the HDD 102#0 on a 4 KB physical sector basis. Specifically, the physical sectors are units of the writing of data in the HDD 102#0.

Data may be written in sectors of 512 bytes, depending on software such as an OS executed in the server 203. In accordance with a write command from the software, writing of data in sectors of an integral multiple of 512 bytes is requested. In this case, writing that does not support 4 KB alignment of physical sectors of the HDD 102#0 may be executed. If the writing that does not support the 4 KB alignment is requested, the processor 501 executes the RMW process.

Figure 6:
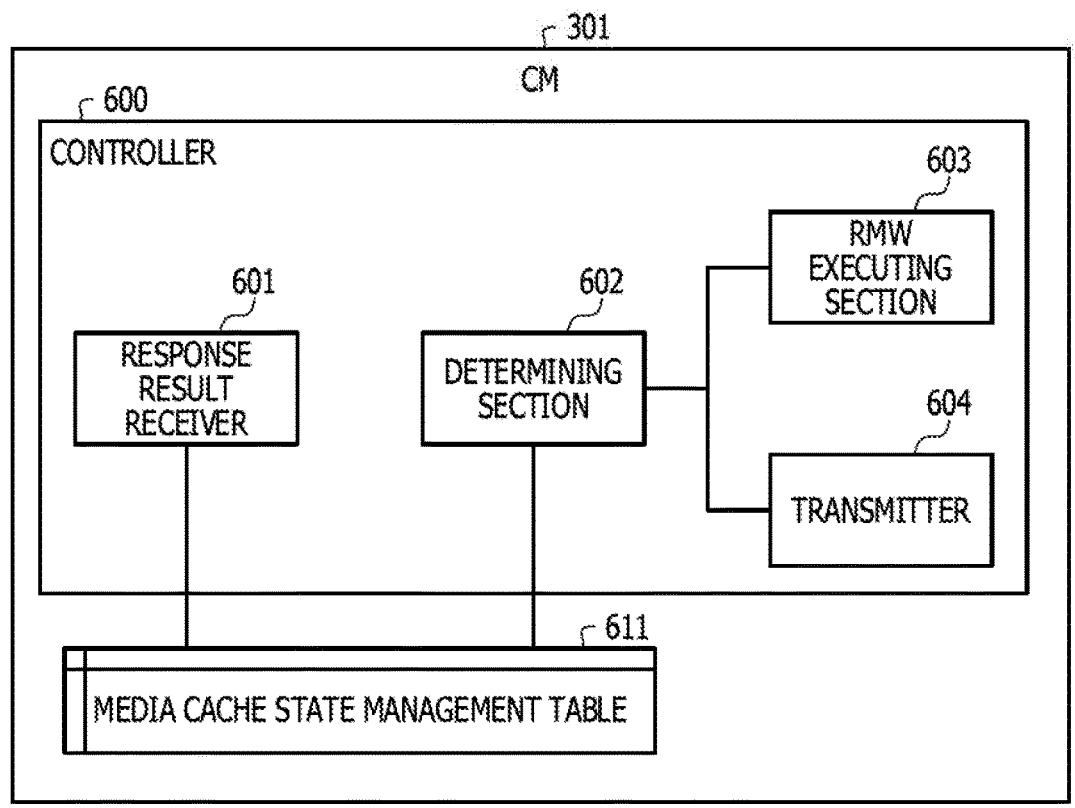
FIG. 6 is an explanatory diagram illustrating an example of a functional configuration of a CM.

FIG. 6 is an explanatory diagram illustrating an example of a functional configuration of the CM 301. The CM 301 includes a controller 600. The controller 600 includes a response result receiver 601, a determining section 602, an RMW executing section 603, and a transmitter 604. The controller 600 achieves functions of the sections by causing the processor 311 to execute a program stored in a storage device. Specifically, the storage device is the RAM 312 illustrated in FIG. 3, the flash memory 313 illustrated in FIG. 3, or the like, for example. Results of processes executed by the sections are stored in a register of the processor 311, a cache memory of the processor 311, the RAM 312, or the like. The CM 302 has the same functions as the CM 301.

The CM 301 may access a media cache state management table 611. Information stored in the media cache state management table 611 is stored in the storage device that is the RAM 312 or the like. The media cache state management table 611 stores the usage information 111 of the HDDs 102#0 to 102#N. An example of details set in the media cache state management table 611 is illustrated in FIG. 11.

The response result receiver 601 receives the usage information 111 from the HDDs 102#0 to 102#N. The received usage information 111 is set in the media cache state management table 611.

When data to be written in any of the HDDs 102#0 to 102#N is generated, the determining section 602 determines whether the data to be written is aligned data or unaligned data. For example, if an initial address of the data to be written and the length of the data to be written are divisible by the predetermined value, the determining section 602 determines that the data to be written is aligned data.

If the determining section 602 determines that unaligned data to be written in any of the HDDs 102#0 to 102#N is generated, the controller 600 executes either a process by the transmitter 604 or a process by the RMW executing section 603 based on the usage information 111.

For example, if unaligned data to be written in any of the HDDs 102#0 to 102#N is generated, and the usage information 111 of the HDD 102 in which the data is to be written indicates "busy", the RMW executing section 603 executes the RMW process on the data to be written. Aligned data obtained by the RMW process and to be written is transmitted to the HDD 102 in which the data is to be written.

If unaligned data to be written in any of the HDDs 102#0 to 102#N is generated, and the usage information 111 of the HDD 102 in which the data is to be written indicates "free", the transmitter 604 transmits a request to write the data to the HDD 102 in which the data is to be written. Thus, the HDD 102 in which the data is to be written executes the RMW process on the data to be written.

Next, flowcharts of processes to be executed when commands are to be issued by the CM 301 to an HDD 102 are described with reference to FIGS. 7 to 10.

Figure 7:
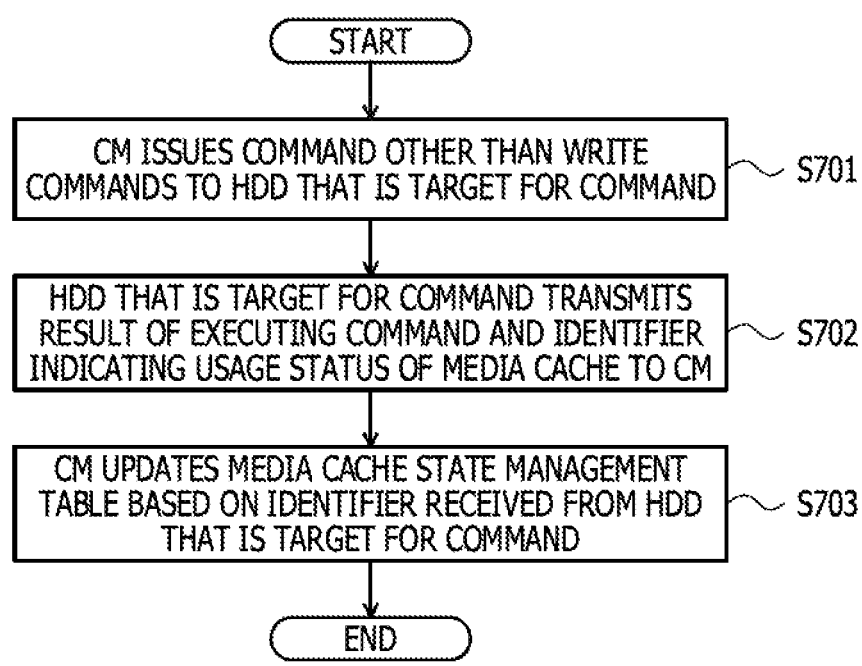
FIG. 7 is a flowchart of an example of a procedure for a process to be executed when a command other than write commands is to be issued.

FIG. 7 is a flowchart of an example of a procedure for a process to be executed when a command other than write commands is to be issued. The process to be executed when a command other than write commands is to be issued is a process to be executed by the CM 301 and an HDD 102 when the command other than write commands is to be issued by the CM 301.

The CM 301 issues a command other than write commands to an HDD 102 that is a target for the command (S701). The command other than write commands is a read command, a test unit ready command, or the like, for example.

The HDD that is the target for the command receives the command and transmits, to the CM 301, a result of executing the command and an identifier indicating a usage status of a media cache 103 of the HDD (S702). The CM 301 receives the execution result and the identifier and updates the media cache state management table 611 based on the identifier received from the HDD that is the target for the command (S703). An example of the update of the media cache state management table 611 is illustrated in FIG. 11. After the termination of the process of S703, the CM 301 and the HDD 102 terminate the process executed when the command other than write commands is to be issued.

Figure 8:
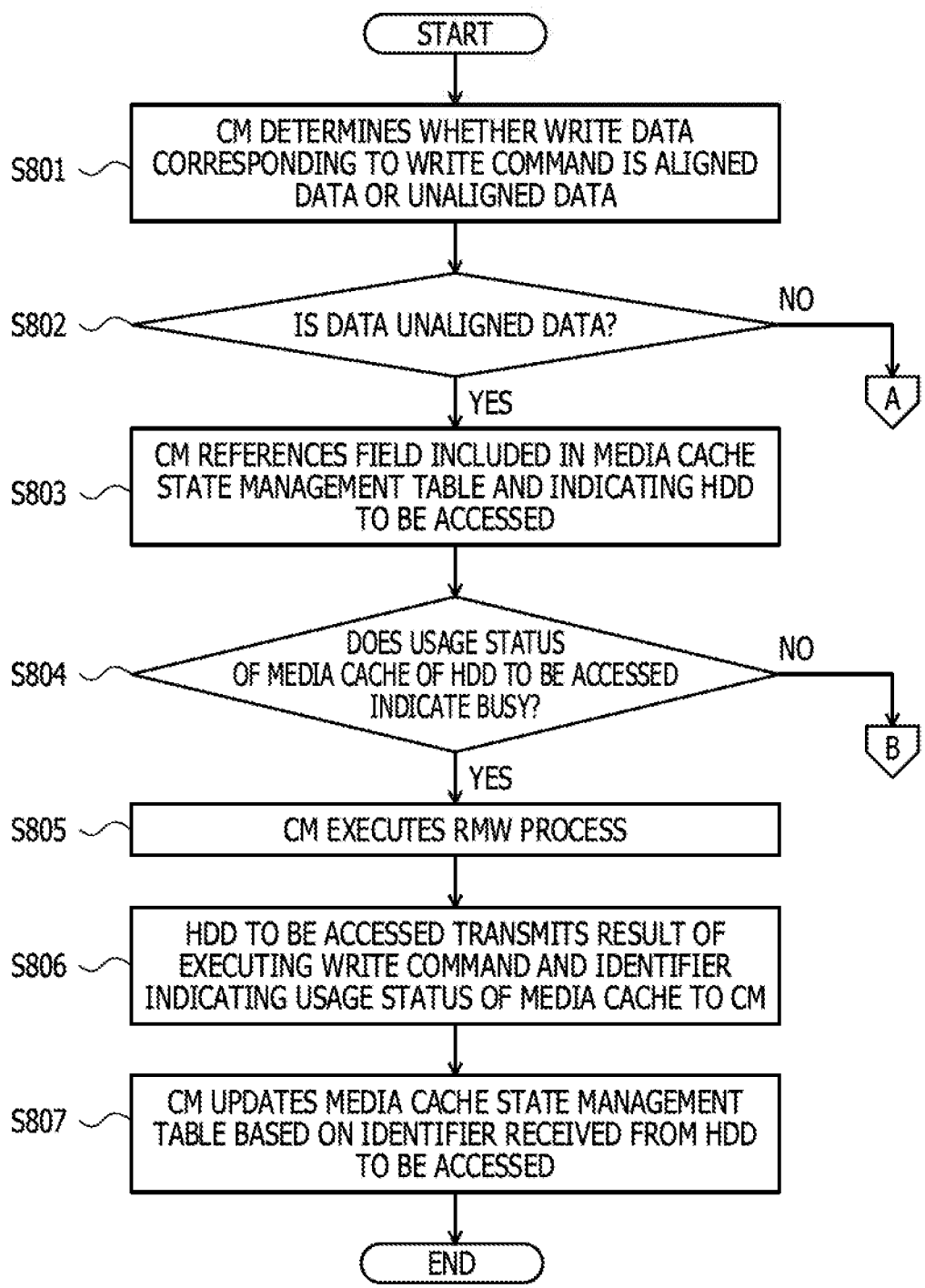
FIG. 8 is a first flowchart of an example of a procedure for a process to be executed when a write command is to be issued.
Figure 9:
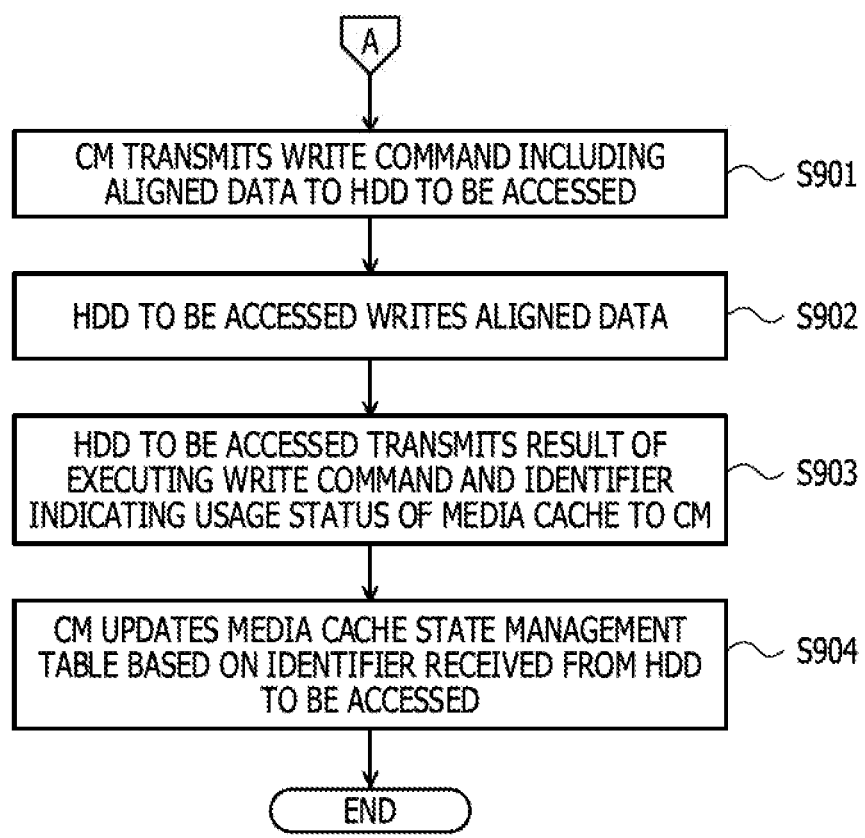
FIG. 9 is a second flowchart of the example of the procedure for the process to be executed when the write command is to be issued.
Figure 10:
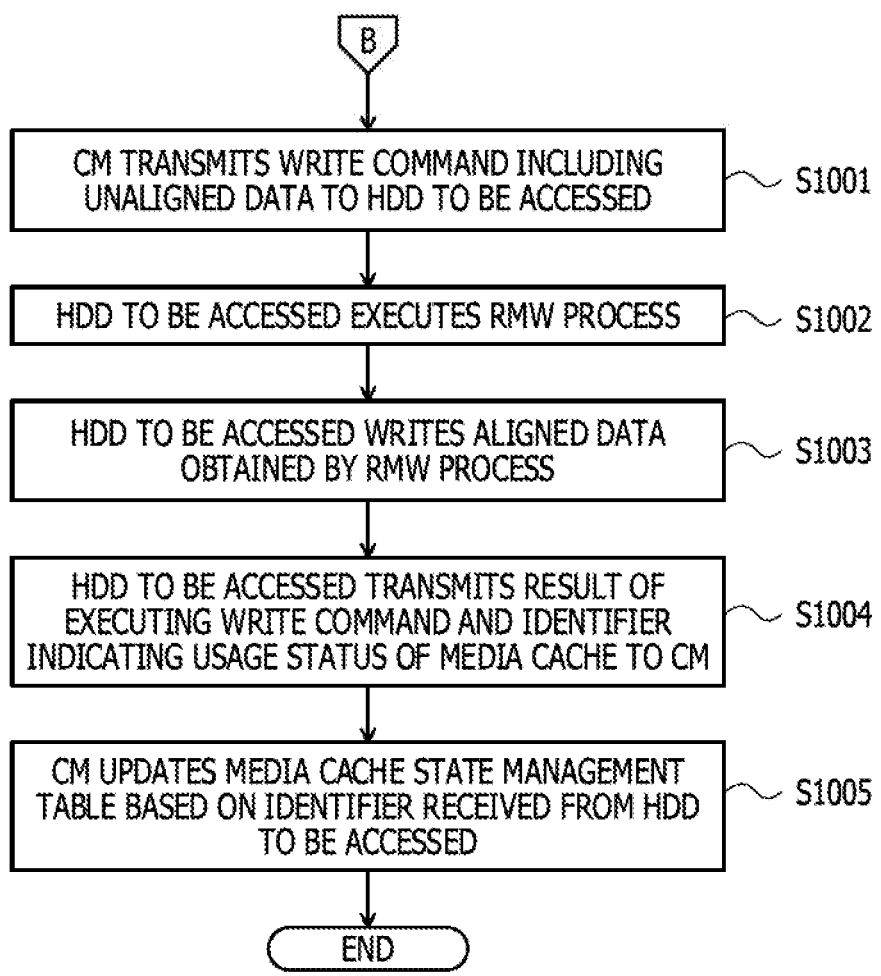
FIG. 10 is a third flowchart of the example of the procedure for the process to be executed when the write command is to be issued.

FIG. 8 is a first flowchart of an example of a procedure for a process to be executed when a write command is to be issued. FIG. 9 is a second flowchart of the example of the process to be executed when the write command is to be issued. FIG. 10 is a third flowchart of the example of the process to be executed when the write command is to be issued. The process to be executed when the write command is to be issued is a process to be executed by the CM 301 and an HDD 102 when the write command is to be issued by the CM 301 to the HDD 102. Steps illustrated in FIG. 9 are processes to be executed when write data is aligned data. Steps illustrated in FIG. 10 are processes to be executed when write data is unaligned data and the media cache 103 is not insufficient.

The CM 301 determines whether write data corresponding to a write command to be issued by the CM 301 to the HDD 102 is aligned data or unaligned data (in S801). Then, the CM 301 determines whether or not the write data corresponding to the write command is unaligned data (in S802). If the write data corresponding to the write command is unaligned data (Yes in S802), the CM 301 references a field included in the media cache state management table 611 and indicating the HDD 102 to be accessed (in S803). Then, the CM 301 determines, based on the result of the referencing, whether or not the usage status of the media cache 103 of the HDD 102 to be accessed indicates busy (in S804). If the usage status of the media cache 103 of the HDD 102 to be accessed indicates busy (Yes in S804), the CM 301 executes the RMW process on the write data corresponding to the write command (in S805).

Then, the HDD 102 to be accessed transmits, to the CM 301, a result of executing the write command and an identifier indicating the usage status of the media cache 103 (in S806). In the process of S806, the CM 301 transmits a read command and the write command to the HDD 102 by the RMW process. Thus, the CM 301 may receive the identifier upon the reception of the result of executing the read command in the RMW process and receive the identifier upon the reception of the result of executing the write command in the RMW process.

The CM 301 receives the execution result and the identifier and updates the media cache state management table 611 based on the identifier received from the HDD 102 to be accessed (in S807). After the termination of the process of S807, the CM 301 and the HDD 102 terminates the process executed when the write command is to be issued.

If the write data corresponding to the write command is not unaligned data (No in S802), the CM 301 transmits the write command including the aligned data to the HDD 102 to be accessed (in S901). The HDD 102 to be accessed receives the write command and writes the aligned data in a magnetic disk 502 included in the HDD 102 to be accessed (in S902). Then, the HDD 102 to be accessed transmits, to the CM 301, the result of executing the write command and the identifier indicating the usage status of the media cache 103 (in S903). The CM 301 receives the execution result and the identifier and updates the media cache state management table 611 based on the identifier received from the HDD 102 to be accessed (in S904). After the termination of the process of S904, the CM 301 and the HDD 102 terminates the process executed when the write command is to be issued.

If the usage status of the media cache 103 of the HDD 102 to be accessed indicates free (No in S804), the CM 301 transmits, to the HDD 102 to be accessed, the write command including the unaligned data (in S1001). The HDD 102 to be accessed receives the write command and executes the RMW process (in S1002). Then, the HDD 102 to be accessed writes the aligned data obtained by the RMW process in a magnetic disk 502 included in the HDD 102 to be accessed (in S1003). Next, the HDD 102 to be accessed transmits, to the CM 301, the result of executing the write command and the identifier indicating the usage status of the media cache 103 (in S1004).

The CM 301 receives the execution result and the identifier and updates the media cache state management table 611 based on the identifier received from the HDD 102 to be accessed (in S1005). After the termination of the process of S1005, the CM 301 and the HDD 102 terminates the process executed when the write command is to be issued.

FIG. ibis an explanatory diagram illustrating an example of details stored in the media cache state management table 611. FIG. 11 illustrates a media cache state management table 611a that is the media cache state management table 611 in an initial state. FIG. 11 also illustrates a media cache state management table 611b that is the media cache state management table 611 updated from the initial state.

In the media cache state management table 611a that is in the initial state, the usage statuses of the media caches 103 of the HDDs 102#0 to 102#N indicate free. After the HDD 102#1 provides a response indicating busy in response to the reception of a command to write unaligned data, the media cache state management table 611 is updated to the media cache state management table 611b. In the media cache state management table 611b, the usage status of the media cache 103 of the HDD 102#1 indicates busy and the usage statuses of the media caches 103 of the HDDs 102#0 and 102#2 to 102#N indicate free.

As described above, the CM 301 switches, based on the usage information 111#0 to 111#N received from the HDDs 102#0 to 102#N, a main device for executing the RMW process between the CM 301 and an HDD 102 in which data is to be written. Thus, the CM 301 may avoid causing an HDD 102 of which the capacity of a media cache 103 is insufficient to execute the RMW process, and the CM 301 may suppress a reduction in the performance of the responding to a write request.

The CM 301 transmits a command to any of the HDDs 102#0 to 102#N and may receive usage information 111 and the result of executing the command from the HDD 102 to which the command was transmitted. Thus, the HDD 102 may not set a destination to which the usage information 111 is to be transmitted. For example, as illustrated in FIG. 3, the disk array device 202 includes the multiple CMs. Thus, if the HDDs 102 spontaneously transmit the usage information 111, an administrator of the disk array device 202 sets a CM that is among the multiple CMs and to which each of the HDDs 102 transmits the usage information 111. In addition, if each of the HDDs 102 transmits the usage information 111 to all the CMs, a load to be applied to the disk array device 202 increases.

Upon the transmission of a result of executing a command to the CM 301, an HDD 102 may spontaneously transmit the usage information 111 only when the usage status of the media cache 103 of the HDD 102 changes. In this case, the CM 301 may appropriately recognize the usage status of the media cache 103 and the performance of the responding to a write request may be improved.

For example, it is assumed that the CM 301 transmits a write command to a certain HDD 102 and receives a result of executing the write command and the usage information 111 indicating "busy" from the certain HDD 102. After that, the certain HDD 102 completes the RMW process and the media cache 103 included in the certain HDD 102 becomes an unused state. After the media cache 103 becomes the unused state, the certain HDD 102 spontaneously transmits the usage information 111 indicating "free" to the CM 301. It is assumed after the spontaneous transmission, unaligned data to be written in the certain HDD 102 is generated without transmission of any command from the CM 301 to the certain HDD 102. In this case, since the usage information 111 within the media cache state management table 611 indicates "free", the CM 301 may transmit the unaligned data to be written to the certain HDD 102 and cause the certain HDD 102 to execute the RMW process.

On the other hand, it is assumed that after the RMW process is completed and the media cache 103 becomes the unused state, the certain HDD 102 does not transmit the usage information 111 indicating "free" to the CM 301. Then, unaligned data to be written in the certain HDD 102 is generated without transmission of any command from the CM 301 to the certain HDD 102. In this case, since the usage information 111 within the media cache state management table 611 indicates "busy", the CM 301 executes the RMW process regardless of the fact that the CM 301 is able to cause the certain HDD 102 to execute the RMW process.

If the usage information 111 of the certain HDD 102 indicates "busy" when the unaligned data to be written in the certain HDD 102 is generated, the CM 301 may execute the RMW process. Thus, the CM 301 may avoid causing an HDD 102 of which the capacity of a media cache 103 is insufficient to execute the RMW process, and the CM 301 may suppress a reduction in the performance of the responding to a write request.

If the usage information 111 of the certain HDD 102 indicates "free" when the unaligned data to be written in the certain HDD 102 is generated, the CM 301 may transmit a request to write the unaligned data in the certain HDD 102. Thus, the CM 301 may cause the certain HDD 102 to execute the RMW process, and the performance of the responding to a write request may be improved, compared with the case where the CM 301 executes the RMW process.

If the CM 301 determines that data to be written is unaligned data when the data to be written in the certain HDD 102 is generated, the CM 301 may switch, based on the usage information 111, a main device for executing the RMW process between the CM 301 and the HDD 102 in which the data is to be written. Only if data to be written is unaligned data, the CM 301 references the usage information 111. If the data to be written is aligned data, the CM 301 may write the data in the HDD 102 without executing ineffective processes such as the referencing of the usage information 111.

In the embodiment, it is preferable that the storage be HDDs. This is due to the fact that Advanced Format is used with increases in the capacities of the HDDs and increases in the amounts of data to be processed at one time. The embodiment is applicable to a case where a format in which the sizes of physical sectors are expanded to 8 KB, 16 KB, or the like is used. Even if the storage is SSDs, the embodiment is applicable to the case where the format in which the sizes of physical sectors are expanded to 8 KB, 16 KB, or the like is used or another similar case.

The embodiment is applicable to a system in which access performance of the HDDs #0 to #N varies and the HDDs #0 to #N are layered. For example, a device configured to manage layers of the HDDs #0 to #N may be applied to the embodiment and dynamically switch, based on state information of an HDD achieving a certain layer, between the RMW process to be executed by the HDD and the RMW process to be executed by the device configured to manage the layers of the HDDs #0 to #N.

The storage control method described in the embodiment may be achieved by causing a computer such as a personal computer or a workstation to execute a program prepared in advance. The storage control program is stored in a computer-readable storage medium such as a hard disk, a flexible disk, a compact disc-read only memory (CD-ROM), or a DVD, read by the computer from the storage medium, and executed by the computer. The storage control program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control method executed by a processor included in a storage control device, the storage control device being coupled to a storage including a media cache, the storage being capable of executing a read-modify-write process that includes generating, by using the media cache, aligned data with an address range divisible by a predetermined value from unaligned data with an address range indivisible by the predetermined value, the storage control method comprising:
    receiving, from the storage, usage information indicating a usage status of the media cache;
    receiving a write request to write the unaligned data in the storage;
    transmitting the unaligned data corresponding to the write request to the storage, when the usage information indicates that an available capacity of the media cache is equal to or smaller than a threshold;
    generating the aligned data from the unaligned data corresponding to the write request by executing the read-modify-write process within the storage control device, when the usage information indicates that the available capacity of the media cache is larger than the threshold; and
    transmitting the generated aligned data to the storage,
    wherein the receiving the usage information includes receiving the usage information and a result of executing a command in response to the transmission of the command from the storage control device to the storage.

2. The storage control method according to claim 1, wherein the usage information is information transmitted by the storage together with the result of executing the command when the storage determines that the usage status of the media cache changed.

3. The storage control method according to claim 1, further comprising
    transmitting a request to transmit the usage information to the storage,
    wherein the receiving the usage information includes receiving the usage information transmitted in response to the reception of the transmit request by the storage.

4. The storage control method according to claim 1, wherein the transmitting the unaligned data to the storage includes transmitting, to the storage, a write command to request the unaligned data to be written.

5. The storage control method according to claim 1, further comprising
    determining whether the data corresponding to the write request is the aligned data or the unaligned data.

6. The storage control method according to claim 1, wherein the predetermined value is equal to the sizes of physical sectors of the storage.

7. A storage control device coupled to a storage including a media cache, the storage being capable of executing a read-modify-write process that includes generating, by using the media cache, aligned data with an address range divisible by a predetermined value from unaligned data with an address range indivisible by the predetermined value, the storage control device comprising:
    a memory; and
    a processor coupled to the memory and configured to:
        receive, from the storage, usage information indicating a usage status of the media cache;

receive a write request to write the unaligned data in the storage;

transmit the unaligned data corresponding to the write request to the storage, when the usage information indicates that an available capacity of the media cache is equal to or smaller than a threshold;

generate the aligned data from the unaligned data corresponding to the write request by executing the read-modify-write process within the storage control device, when the usage information indicates that the available capacity of the media cache is larger than the threshold; and transmit the generated aligned data to the storage, wherein the processor is configured to receive the usage information and a result of executing a command in response to the transmission of the command from the storage control device to the storage.

8. A non-transitory computer-readable storage medium storing a program that causes a processor included in a storage control device to execute a process, the storage control device being coupled to a storage including a media cache, the storage being capable of executing a read-modify-write process that includes generating, by using the media cache, aligned data with an address range divisible by a predetermined value from unaligned data with an address range indivisible by the predetermined value, the process comprising:

receiving, from the storage, usage information indicating a usage status of the media cache;

receiving a write request to write the unaligned data in the storage;

transmitting the unaligned data corresponding to the write request to the storage, when the usage information indicates that an available capacity of the media cache is equal to or smaller than a threshold;

generating the aligned data from the unaligned data corresponding to the write request by executing the read-modify-write process within the storage control device, when the usage information indicates that the available capacity of the media cache is larger than the threshold; and transmitting the generated aligned data to the storage, wherein the receiving the usage information includes receiving the usage information and a result of executing a command in response to the transmission of the command from the storage control device to the storage.

* * * * *